Nov. 16, 1965　　　　　　G. S. KNOX　　　　　　3,217,604
AUXILIARY COUPLING AND DE-COUPLING FOR FLUID DRIVE
Filed Sept. 3, 1963　　　　　　　　　　　3 Sheets-Sheet 3

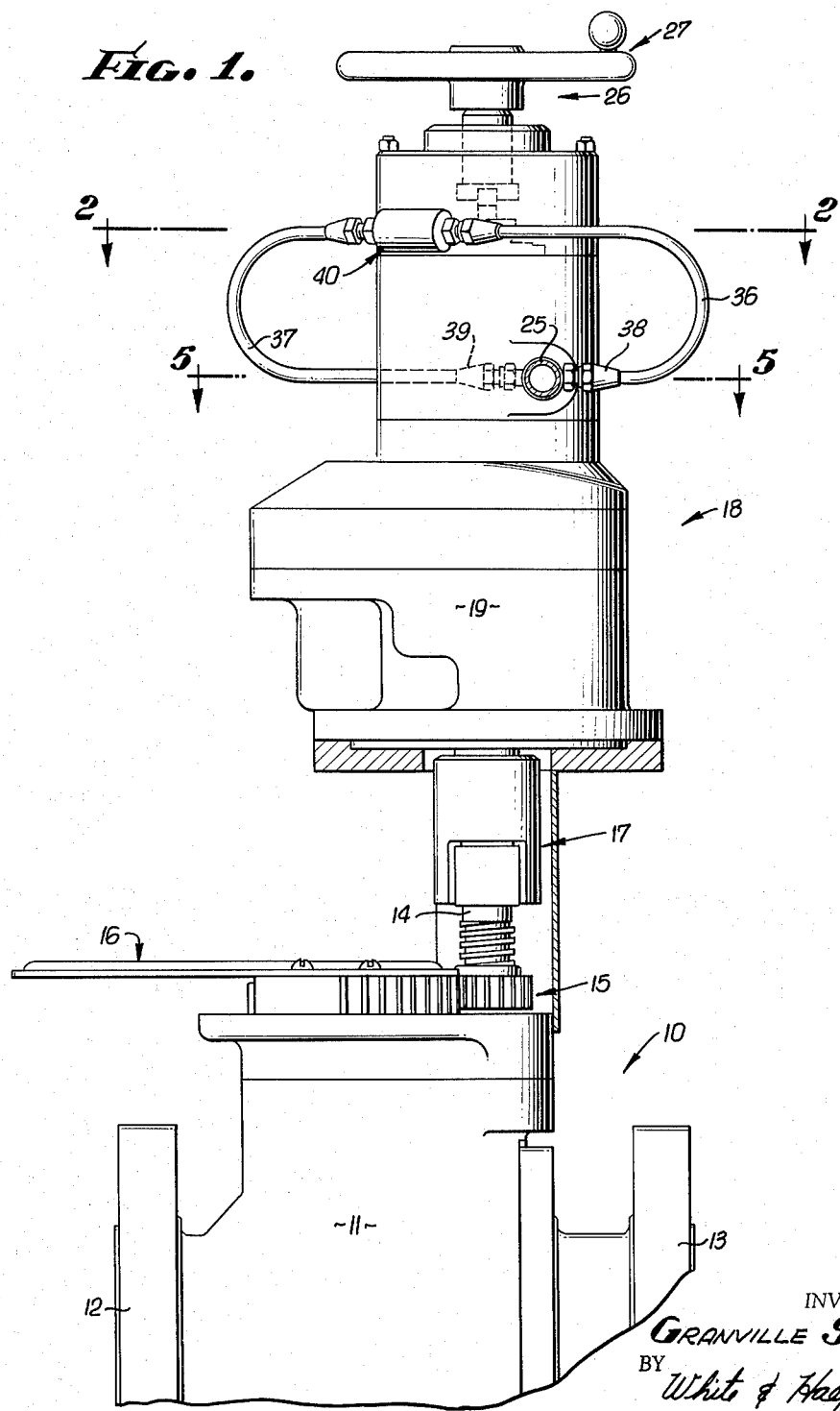

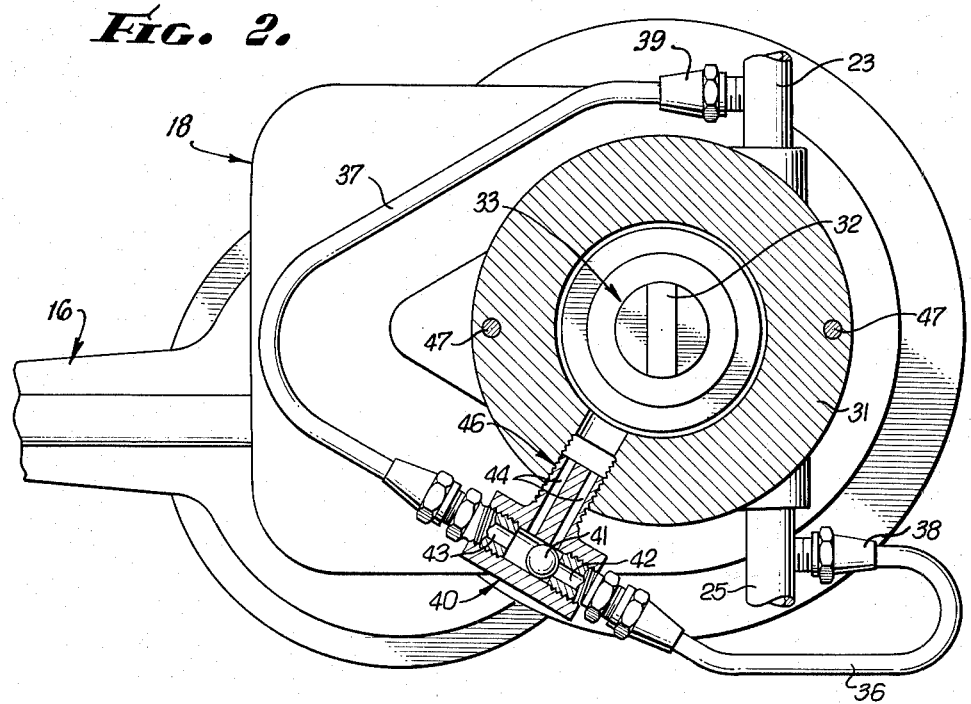
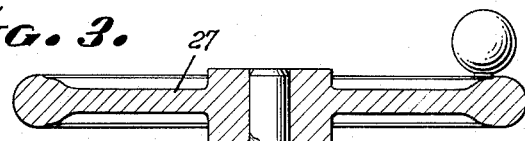
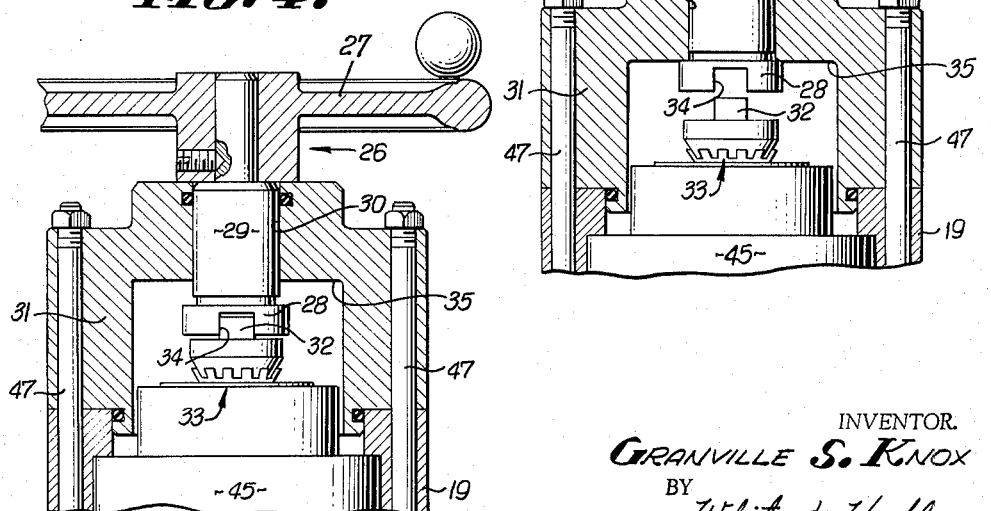
INVENTOR.
*GRANVILLE S. KNOX*
BY
*White & Haefliger*
ATTORNEYS.

INVENTOR.
GRANVILLE S. KNOX
BY
White & Haefliger
ATTORNEYS.

United States Patent Office 3,217,604
Patented Nov. 16, 1965

3,217,604
AUXILIARY COUPLING AND DE-COUPLING
FOR FLUID DRIVE
Granville S. Knox, Glendale, Calif., assignor to Hydril
Company, Los Angeles, Calif., a corporation of Ohio
Filed Sept. 3, 1963, Ser. No. 306,264
24 Claims. (Cl. 91—44)

This invention relates generally to the control of rotary assemblies such as rotary motors and pumps, and more particularly concerns fluid pressure responsive means for effecting selective turning or holding of such rotary assemblies.

One problem which is solved by the present invention has to do with preventing dangerous rotation of exposed auxiliary handwheels or the like during rotary motor operation. Thus, in a typical installation, a valve will be normally opened or closed by a rotary motor, and an auxiliary handwheel is provided to operate the valve in an emergency at which time the motor may, or may not be operable. Unless the handwheel is prevented from rotating during normal motor operation, serious injury to personnel can occur. Another problem solved by the invention concerns the control of fluid operated multiple motor installations. Typically, it is required that the shafts of one or more of such motors be locked against rotation at times when certain other motors in the system are operative and vice versa.

The present invention, contemplating an unusual and highly desirable yet simple solution to the above problems, broadly comprises means including a coupling element adapted for combination with a rotary assembly operable in response to fluid pressure application thereto, the element and rotary assembly being relatively movable between alternate relative positions in at least one of which the element and assembly are coupled to rotate together. Further, at least one of the element and rotary assembly has pressure receiving surfacing to which fluid pressure is applicable to effect said relative movement in response to fluid pressure application to the rotary assembly. Thus, the coupling element may have said surfacing and may be movable between alternate positions relative to the rotary assembly in the form of a pump or motor, and in addition, means may be provided for communicating said fluid pressure to said surfacing in response to fluid pressure application to the rotary assembly.

More specifically, the means including a pressure responsive coupling element may be adapted to alter a coupling relationship between the rotary assembly and what may be generally referred to as auxiliary structure, as for instance the element may have one position in which the rotary assembly is coupled to a rotative part of the auxiliary structure and another position in which the assembly is coupled to a non-rotative part of the auxiliary structure and there may be other times in which the assembly and auxiliary structure are de-coupled. In the valve application or example first mentioned above, the auxiliary structure typically may take the form of an auxiliary handwheel drive for turning the rotor of the valve motor and is adapted to be used in the absence of fluid operating pressure application to the motor. Such pressure application normally serves to move the coupling element away from a position of possible engagement with the rotary assembly of the motor so that the coupling element and auxiliary handwheel will not rotate with the motor. In the above referred to application requiring locking of the rotating assembly or motor against turning when other motors are operating, the auxiliary structure comprises a stop for blocking rotation of the coupling element and motor when the coupling element is moved out of a position permitting simultaneous rotation of the coupling element and motor upon pressure application thereto. Reverse pressure application to the coupling element shifts it to a position wherein the element and motor are again free for simultaneous rotation.

Other features and objects of the invention include the provision of a novel pilot valve chamber communicating between forward and reverse pressure conduits which connect with the rotary assembly or motor, and a valve stopper such as a ball movable to pass forward fluid pressure to the coupling element while blocking leakage thereof via the reverse pressure conduit, and to pass reverse fluid pressure to the element while blocking leakage thereof via the forward pressure conduit. Also, a control chamber typically contains the coupling element, the pilot valve having an outlet communicating with the control chamber and first and second inlets respectively to pass forward and reverse fluid pressure into the pilot valve chamber for communication through the outlet and with the coupling element in the control chamber.

Finally, the invention contemplates a system that includes multiple reversible rotary motors independently operable in response to forward and reverse fluid pressure application thereto, each motor being subject to blockage against rotation by a coupling element in a first position to engage an auxiliary stop, and being free to rotate when the element is moved to a second position. The system also includes means for communicating pressure to effect movement of the coupling element associated with any selected motor to said second position, and for simultaneously communicating said fluid pressure to effect movement of the coupling element associated with a non-selected motor to said first position, all in response to either forward or reverse fluid pressure application to the selected motor.

These and other objects and advantages of the invention, as well as the details of an illustrative embodiment, will be more fully understood from the following detailed description of the drawing, in which:

FIG. 1 is an elevation showing a valve operable by a rotary motor which may be coupled and de-coupled with an auxiliary handwheel;

FIG. 2 is a cross-section taken on line 2—2 of FIG. 1;

FIG. 3 is an enlarged vertical elevation showing the manner in which the rotary motor may be de-coupled from the auxiliary handwheel of FIG. 1;

FIG. 4 is a view like FIG. 3 showing the manner in which the motor may be coupled to the auxiliary handwheel;

Referring first to FIGURES 1 and 2, a valve assembly is generally illustrated at 10 to include a body 11 in which a stopper is contained for rotation between flow blanking and flow passing positions. In this regard, the flow may be considered to pass between opposite end portions 12 and 13 of the valve assembly when the stopper is in flow passing position. Rotation of the stopper for control of the flow is typically effective in response to rotation of the shaft 14 which is coupled to the stopper through a gear type transmission generally indicated at 15. For purposes of illustration, a typical valve unit or assembly of the type described and shown in my U.S. Patent No. 2,863,629. An indicator is shown at 16 as coupled to the stopper stem for turning with the stopper to indicate the open or closed condition thereof.

Figure 5:
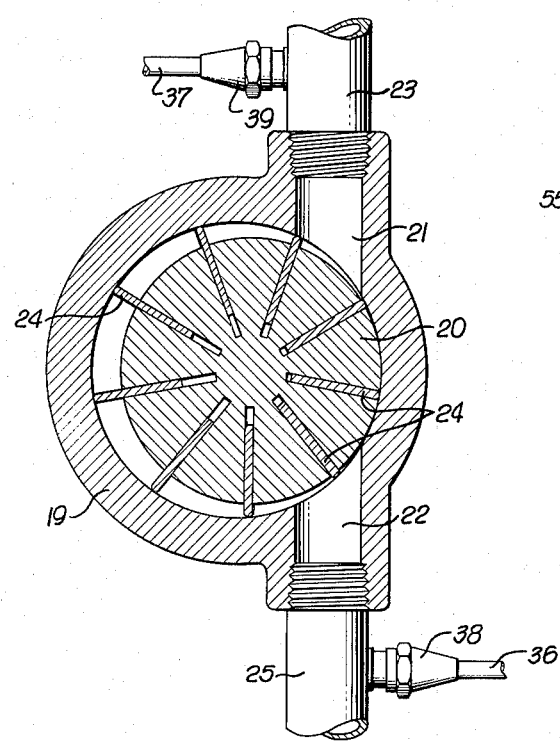
FIG. 5 is a section taken on line 5—5 of FIG. 1.

Typically mounted on the valve assembly for opening and closing the stopper is a reversible rotary motor unit generally indicated at 18. FIGURES 1 and 5 show the unit to include a housing 19 containing a rotor 20 connected by coupling 17 with the shaft 14, the housing having ports 21 and 22 for communicating forward and reverse fluid pressure application to the rotor. Thus, when forward pressure is delivered through the conduit 23, the rotor together with its vanes 24 is driven in one rotary direction, and the fluid pressure is exhausted through the opposite port 22 and the conduit 25. Conversely, when reverse fluid pressure is delivered through the latter conduit, the rotor together with its vanes is driven in the opposite rotary direction and the exhaust fluid such as air is passed through the port 21 and the conduit 23. Accordingly, the motor is operable to turn the valve stopper between open and closed positions in a typical installation.

Coming now to a description of that portion of the invention which gives the combination a new function together with advantages accruing therefrom, auxiliary control structure in the form of an auxiliary drive is shown at 26 in FIGURE 1. Such structure typically includes a handwheel 27 enabling the valve to be opened or closed by hand in the event that the motor unit 18 is for some reason inoperative. Such a condition might occur where the fluid pressure delivery to the motor fails, as brought about by a leak in the fluid line. On the other hand, when the motor 18 is operative, turning of the handwheel by the motor could be dangerous to personnel especially where the motor turns rapidly.

The invention overcomes this problem through the provision of means for altering a coupling relationship between a member rotatable with the motor and the auxiliary structure 26. In the embodiment shown, the said means includes a pressure responsive coupling element such as clutch member 28 having a first position as illustrated in FIGURE 4 in which the motor is coupled to the auxiliary structure 26, and a second position as seen in FIGURE 3 in which the motor and auxiliary structure are de-coupled. More specifically, the element 28 is integral with the structure 26, a rotary shaft 29 connecting same, and the shaft being received within a bore 30 provided in the cap 31 for the motor housing 19. The construction is such that the shaft 29 is slidable upwardly in the bore 30 to lift the handwheel in response to sufficient upward fluid pressure exertion against the underside of the coupling element 28, thereby to de-couple the element 28 from a counterpart element 32 which is connected to the motor rotor as through a suitable connection 33. The counterpart element 32 may be in the form of a tongue or key receivable within the coupling groove 34 of the element 28, as illustrated. Finally, in the upward or de-coupled position of the element 28 it abuts against the cap interior face 35, as seen in FIGURE 3. In the absence of fluid pressure exertion upwardly against the element 28 as described, it drops, or may otherwise be displaced downwardly to the coupled position shown in FIGURE 4 wherein it is coupled to the counterpart element 32, thereby providing a direct coupling relationship between the handwheel and the motor rotor, allowing the valve to be opened or closed by the handwheel.

Further, in accordance with the invention, other means is provided for communicating pressure to effect movement of the element 28 to the mentioned de-coupled position in response to fluid pressure application to the motor. Typically, said other means includes forward and reverse pressure lines or extensions 36 and 37 which may communicate with the main pressure conduits 25 and 23, as seen in FIGURE 5, suitable couplings being shown at 38 and 39. Also a pilot valve chamber as shown at 40 in FIGURE 2 to communicate between the conduits or lines 36 and 37 and the coupling element 28. The chamber 40 contains a valve stopper 41, shown as a ball, which is freely movable to block a first chamber inlet 42 in response to reverse fluid pressure communication through a second chamber inlet 43 and through the chamber outlet 44 to the coupling element 28. Conversely, the stopper 41 is movable to block the second inlet 43 in response to forward fluid pressure communication through line 36 and the first inlet 42 to the outlet 44 and to the coupling element 28. Accordingly, no matter whether the fluid or air motor is rotated forwardly or reversely, the fluid pressure supply is communicated through the pilot valve chamber 40 to the coupling element 28 to lift the latter to said second position seen in FIGURE 3, thereby to de-couple the handwheel from the motor.

Referring more specifically to the particular structure shown, the coupling element 28 may be considered as contained within a control chamber formed by the cap 31 and motor body 45. Further, the control chamber so defined communicates with the pilot valve chamber 40 through the outlet or outlets 44 in the latter which is threaded into the motor cap 31 at the general location 46 in FIGURE 2. FIGURES 3 and 4 show the cap 31 suitably connected to the motor housing 19 as by elongated fasteners 47.

Figure 6:
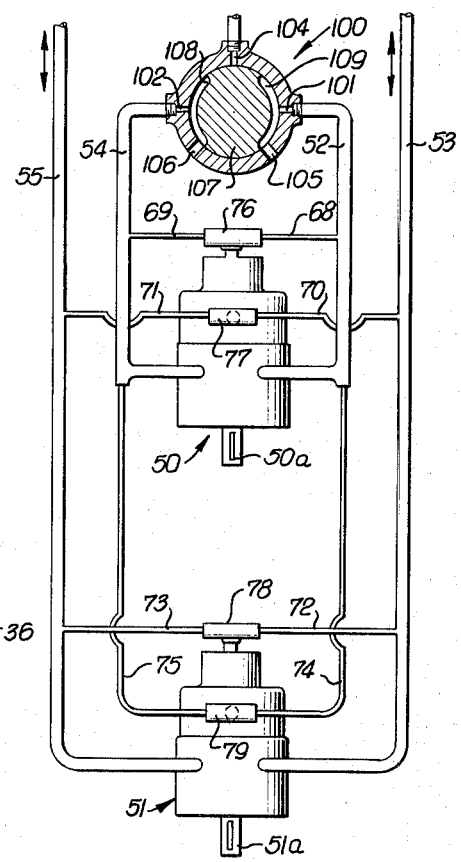
FIG. 6 is a showing of a system including multiple rotary motors which are fluid operated and controlled in accordance with the invention.

Referring now to FIGURE 6, a system is shown to include multiple reversible rotary motor units 50 and 51 which are independently operable in response to forward and reverse fluid pressure application thereto. For example, forward pressure, that is pressure to rotate the motors in forward directions, is supplied to the respective motors 50 and 51 through conduits 52 and 53. The motors may also be considered as pumps driven by shafts 50a and 51a.

Figure 7:
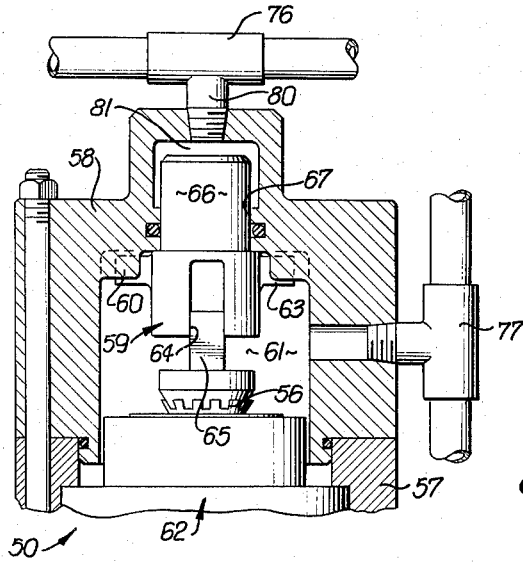
FIG. 7 is an enlarged vertical elevation taken in section to show the manner in which the motors of FIG. 6 may be coupled and de-coupled to auxiliary structure for control purposes.

Extending the description to FIGURE 7, a member rotatable with typical motor 50 is shown at 56, a housing and cap for the motor being respectively shown at 57 and 58. The auxiliary structure in this instance includes a stop for blocking rotation of the coupling element 59 in its first or up position, a typical stop being indicated at 60. Thus, when fluid pressure is applied to the interior 61 of the control chamber formed by the cap 58 and motor structure 62, it lifts the coupling element 59 to engage the stop 60, thereby to block rotation of the motor. More specifically, the coupling element 59 may include wings 63 to engage the stop shoulders 60, and the element may also be slotted at 64 to remain in coupling relationship with a counterpart coupling element 65 integral with the member 56 which turns with the motor rotor. In the absence of such fluid pressure communication to the chamber interior 61, the coupling element 59 is freed for movement to its second position in which the motor becomes unblocked from rotation. A coupling element stem is shown at 66 as piloting in the bore 67 of the cap to guide the element between its first and second positions. Accordingly, the element 59 may be considered as supported by the auxiliary control structure which includes the cap 58.

That form of the invention shown in FIGURES 6 and 7 may also be considered as including other means for communicating pressure to effect movement of the coupling element associated with any selected motor to second position, and for simultaneously communicating said fluid pressure to effect movement of the coupling element associated with a non-selected motor to first position, all in response to either forward or reverse fluid pressure application to the selected motor. Such means typically includes the forward and reverse fluid pressure lines or conduit extensions 68 to 75 as illustrated. Also such means includes the pilot valve chambers 76 to 79 communicating between different of the lines 68 to 75 and the coupling elements associated with the motors. As previously described, each pilot valve chamber contains a stopper movable in the chamber to pass forward fluid pressure to the coupling element while blocking leakage thereof via the reverse pressure line, and conversely, to pass reverse fluid pressure to the coupling element while blocking leakage thereof via the forward pressure line.

In the example shown in FIGURE 6, the pilot valve chambers 76 and 77 for the motor 50 may be considered more broadly as $X_1$ and $X_2$ chambers for an X motor. Also, the pilot valve chambers 78 and 79 for the motor 51 may be broadly considered as $Y_1$ and $Y_2$ chambers for a Y motor. Each pilot valve chamber may be considered to have the construction as shown in FIGURE 2 with inlets and an outlet, there being a stopper in each chamber movable to block one inlet in response to reverse fluid pressure communication through the other inlet, and to block the other inlet in response to forward fluid pressure communication through the one inlet.

As a result, as shown in FIGURE 6, the chambers 76 and 79 each have inlets respectively communicating with the forward and reverse pressure conduits 52 and 54 for the motor 50, whereas the chambers 77 and 78 each have inlets respectively communicating with the forward and reverse pressure conduits 53 and 55 for the motor 51. In addition, the chambers 76 and 78 have outlets for communicating fluid pressure to the respective coupling elements associated with the motors 50 and 51 to effect movement of each element to second position; and the chambers 77 and 79 have outlets for communicating fluid pressure to the respective coupling elements associated with the motors 50 and 51 to effect movement of each element to first position. In this regard, the outlets of the chambers 76 and 78 are shown at 80 in FIGURE 7, communicating with the subchamber 81 into which the coupling element stem 66 projects, fluid pressure passing to said sub-chamber driving the coupling element 59 downwardly to allow unblocked rotation of the motor.

From the foregoing, it can be seen that when the motor 50 is supplied with forward fluid pressure through line 52, the motor 51 is simultaneously blocked against rotation, and it is also blocked when the motor 50 is supplied with reverse fluid pressure from conduit 54. Likewise, when the motor 51 is supplied with either forward or reverse fluid pressure through conduits 53 or 55, the motor 50 is blocked against rotation.

FIG. 6 also illustrates a valve 100 for selectively controlling pressure flow through forward and reverse pressure conduits 52 and 54. The latter communicate with flow ports 101 and 102 in the valve housing, which also has a pressure inlet port 104 and exhaust ports 105 and 106. After the valve spool 107 is rotated 45 degrees clockwise, the duct 108 communicates pressure fluid from inlet port 104 through flow port 102 to conduit 54, while duct 109 exhausts pressure fluid from conduit 52 through flow port 101 to exhaust port 105. Conversely, when the valve spool 107 is rotated 45 degrees counterclockwise from the position shown, the duct 109 communicates pressure fluid from inlet port 104 through flow port 101 to conduit 52, while duct 108 exhausts pressure fluid from conduit 54 through flow port 102 to exhaust port 106. In some instances it is deisrable that valve 100 be provided with spring means for automatically returning valve spool 107 to the position shown in FIG. 6 after each cycle of operation. A similar valve may be used for selectively controlling pressure flow through forward and reverse pressure conduits 53 and 55.

I claim:

1. In combination with a rotary assembly operable in response to fluid pressure application thereto, means including a coupling element, said element and the rotary assembly being relatively movable between alternate relative positions in at least one of which the element and assembly are coupled to rotate together, at least one of the element and rotary assembly having pressure receiving surfacing to which fluid pressure is applicable to effect said relative movement in response to fluid pressure application to the rotary assembly, a pair of fluid pressure passages, and means responsive to the pressures in said passages to supply the higher pressure in either passage to said surfacing.

2. In combination with a rotary assembly operable in response to fluid pressure application thereto, means including a coupling element, said element being movable relative to the rotary assembly between alternate positions in at least one of which the element and assembly are coupled to rotate together, the element having pressure receiving surfacing to which fluid pressure is applicable to effect said element movement, and other means for communicating said fluid pressure to said surfacing in response to fluid pressure application to the rotary assembly, said other means including first and second passages to contain fluid pressure to drive said assembly forwardly and reversely respectively and means responsive to the pressures in said passages to supply the higher pressure in either passage to said surfacing and to block leakage of said higher pressure to the other passage.

3. In combination with a rotary assembly operable in response to application of fluid pressure thereto, auxiliary control structure to control rotation of the rotary assembly, means for altering a coupling relationship between said assembly and said auxiliary structure and including a pressure responsive coupling element, said element and rotary assembly being relatively movable between alternate relative positions and having at least one position in which the assembly and coupling element are coupled to rotate together, and other means for communicating pressure to effect movement of said element to and from said position in response to fluid pressure application to the assembly, said other means including first and second passages to contain fluid pressure to drive said assembly forwardly and reversely respectively and means responsive to the pressures in said passages to supply the higher pressure in either passage to said surfacing and to block leakage of said higher pressure to the other passage.

4. In combination with a rotary assembly including a motor operable in response to application of fluid pressure thereto, auxiliary control structure in the form of an auxiliary drive for the motor adapted for operation in the absence of fluid pressure application to the motor, means for altering a coupling relationship between a member rotatable with the motor and said auxiliary structure and including a pressure responsive coupling element supported by said structure and having a first position in which the motor is coupled to said auxiliary structure and a second position in which the motor and said auxiliary structure are de-coupled, and other means for communicating pressure to effect movement of said element to said second position in response to fluid pressure application to the motor, said other means including first and second passages to contain fluid pressure to drive said motor forwardly and reversely respectively and means responsive to the pressures in said passages to supply the higher pressure in either passage to said element and to block leakage of said higher pressure to the other passage.

5. In combination with a rotary motor operable in response to application of fluid pressure thereto, auxiliary control structure to control rotation of the motor, means for altering a coupling relationship between a member rotatable with the motor and said auxiliary structure and including a pressure responsive coupling element supported by said structure and having a first position in which the motor is coupled to said auxiliary structure and a second position in which the motor and said auxiliary structure are de-coupled, and other means for communicating pressure to effect movement of said element to said second position in response to fluid pressure application to the motor, said other means including first and second passages to contain fluid pressure to drive said motor forwardly and reversely respectively and means responsive to the pressures in said passages to supply the higher pressure in either passage to said element and to block leakage of said higher pressure to the other passage, said auxiliary structure being in the form of a stop for blocking rotation of said coupling element in said first position.

6. In combination with a reversible rotary motor operable in response to forward and reverse fluid pressure application thereto, auxiliary control structure to control rotation of the motor, means for altering a coupling relationship between a member rotatable with the motor and said auxiliary structure and including a coupling element with fluid pressure responsive surfacing, said element being supported by said structure and having a first position in which the motor is coupled to said auxiliary structure and a second position in which the motor and said auxiliary structure are de-coupled, and other means for communicating pressure to effect movement of said element to said second position in response to application to the motor of either said forward or reverse fluid pressure, said other means including forward and reverse pressure passages, a pilot valve chamber communicating between said passages and said element, and valve stopper means movable to pass forward fluid pressure to said element while blocking leakage thereof via said reverse pressure passage, and to pass reverse fluid pressure to said element while blocking leakage thereof via said forward pressure passage.

7. The invention as defined in claim 6, in which said structure includes a control chamber containing said surface, said pilot valve chamber having an outlet communicating with said control chamber and first and second inlets respectively to pass said forward and reverse fluid pressure into said pilot valve chamber for communication through said outlet with said control chamber and surface contained thereby.

8. The invention as defined in claim 7, in which said stopper comprises a ball freely movable to block the first inlet in response to reverse fluid pressure communication through said second inlet, and to block the second inlet in response to forward flow pressure communication through said first inlet.

9. The invention as defined in claim 7, in which said motor rotary member projects into said control chamber and is engageable by said coupling element in said first position.

10. For use in combination with a rotary motor operable in response to application of fluid pressure thereto, auxiliary control structure to control rotation of the motor, means for altering a coupling relationship between a member rotatable with the motor and said auxiliary structure and including a pressure responsive coupling element supported by said structure and having a first position in which the motor is coupled to said auxiliary structure and a second position in which the motor and said auxiliary structure are de-coupled, and other means for communicating pressure to effect movement of said element to said second position in response to fluid pressure application to the motor, said other means including first and second passages to contain fluid pressure to drive said motor forwardly and reversely respectively and means responsive to the pressures in said passages to supply the higher pressure in either passage to said element and to block leakage of said higher pressure to the other passage.

11. For use in combination with a rotary assembly operable forwardly and reversibly in response to forward and reverse fluid pressure application thereto, auxiliary control structure to control rotation of said assembly, means for altering a coupling relationship between said assembly and said auxiliary structure and including a coupling element with fluid pressure responsive surfacing, said element being supported by said structure and having a first position which the assembly is coupled to said auxiliary structure and a second poistion in which the assembly and said auxiliary structure are de-coupled, and other means for communicating pressure to effect movement of said element between said positions in response to application to the assembly of either said forward or reverse fluid pressure, said other means including forward and reverse pressure conduits, a pilot valve chamber communicating between said conduits and said element, and valve stopper means movable to pass forward fluid pressure to said element while blocking leakage thereof via said reverse pressure conduit, and to pass reverse fluid pressure to said element while blocking leakage thereof via said forward pressure conduit.

12. The invention as defined in claim 11, in which said auxiliary structure includes an externally exposed rotary manual control operable to rotate the assembly in the absence of fluid pressure application thereto.

13. The invention as defined in claim 11, in which said structure includes a control chamber containing said surface, said pilot valve chamber having an outlet communicating with said control chamber and first and second inlets respectively to pass said forward and reverse fluid pressure into said pilot valve chamber for communication through said outlet with said control chamber and surface contained thereby.

14. The invention as defined in claim 13, in which said stopper comprises a ball freely movable to block the first inlet in response to reverse fluid pressure communication through said second inlet, and to block the second inlet in response to forward fluid pressure communication through said first inlet.

15. The invention as defined in claim 13, in which said assembly comprises a motor having a member projecting into said control chamber and engageable by said coupling element in said first position.

16. The invention as defined in claim 6 in which said auxiliary structure includes a control chamber containing said surface, and a stop shoulder in said chamber for blocking rotation of said coupling element in said first position.

17. The invention is defined in claim 6 including additional means for communicating pressure to effect movement of said element to said first position.

18. In a system that includes multiple rotary motors operable in response to application of fluid pressure thereto, and in combination with each motor, auxiliary control structure to control rotation of said motor, means for altering a coupling relationship between a member rotatable with the motor and said auxiliary structure and including a pressure responsive coupling element supported by said structure and having a first position in which the motor is coupled to said auxiliary structure and a second position in which the motor and said auxiliary structure are de-coupled, said auxiliary structure being in the form of a stop for blocking rotation of said coupling element in said first position and other means for communicating pressure to effect movement of the coupling element associated with any selected motor to said second position and for simultaneously communicating pressure to effect movement of the coupling element associated with a non-selected motor to said first position all in response to fluid pressure application to said selected motor.

19. In a system that includes multiple reversible rotary motors independently operable in response to forward and reverse fluid pressure application thereto, and in combination with each motor, auxiliary control structure to control rotation of said motor, means for altering a coupling relationship between a member rotatable with the motor and said auxiliary structure and including a coupling element with fluid pressure responsive surfacing, said element having a first position in which the motor is coupled to said auxiliary structure and a second position in which the motor and said auxiliary structure are de-coupled, said auxiliary structure being in the form of a stop for blocking rotation of said coupling element in said first position, and other means for communicating pressure to effect movement of the coupling element associated with any selected motor to said second position and for simultaneously communicating said fluid pressure to effect movement of the coupling element associated with a non-selected motor to said first position, all in response to either forward or reverse fluid pressure application to said selected motor.

20. The invention as defined in claim 19 in which said last named means includes forward and reverse fluid pressure conduits communicable with each motor, pilot valve chambers communicating between said conduits and elements, and valve stoppers movable in said chambers to pass forward fluid pressure to said elements while blocking leakage thereof via said reverse pressure conduits, and to pass reverse fluid pressure to said elements while blocking leakage thereof via said forward pressure conduits.

21. The invention as defined in claim 20 in which $X_1$ and $X_2$ chambers are for an X motor and $Y_1$ and $Y_2$ chambers are for a Y motor, the $X_1$ and $Y_2$ chambers each having inlets respectively communicating with the forward and reverse pressure conduits for the X motor, the $X_2$ and $Y_1$ chambers each having inlets respectively communicating with the forward and reverse pressure conduits for the Y motor, the $X_1$ and $Y_1$ chambers having outlets for communicating fluid pressure respectively to the coupling elements associated with the X and Y motors to effect movement of each element to said second position, and the $X_2$ and $Y_2$ chambers having outlets for communicating fluid pressure respectively to the coupling elements associated with the X and Y motors to effect movement of each element to said first position, the stopper in each chamber being movable to block one inlet in response to reverse fluid pressure communication through the other inlet, and to block the other inlet in response to forward fluid pressure communication through the one inlet.

22. For combination with a rotary motor operable in response to pressure application thereto, the motor having a housing, structure adapted for connection to the motor and including a control chamber, a rotary manual control exposed externally of said chamber, means for altering a coupling relationship between a member rotatable with the motor and said manual control and including a coupling element with fluid pressure responsive surfacing exposed to the interior of said control chamber, said element being supported by a chamber wall and having a first position in which the motor is coupled to said manual control and a second position in which the motor and said manual control are de-coupled, said control chamber having a port for communicating fluid pressure to the chamber interior thereby to effect movement of said element to said second position in response to fluid pressure application to the motor, a pair of fluid pressure passages, and means responsive to the pressures in said passages to supply the higher pressure in either passage to said surfacing.

23. Apparatus as defined in claim 22 in which said means includes a shaft integral with said element and manual control and movable vertically within a bore in said chamber to present weight resistance to movement of said element between said first and second positions.

24. In combination with a reversible rotary motor operable in response to forward and reverse fluid pressure application thereto, auxiliary control structure to control rotation of the motor, means for altering a coupling relationship between a member rotatable with the motor and said auxiliary structure and including a coupling element with fluid pressure responsive surfacing, said element being supported by said structure and having a first position in which the motor is coupled to said auxiliary structure and a second position in which the motor and said auxiliary structure are de-coupled, and other means for communicating pressure to effect movement of said element to said second position in response to application to the motor of either said forward or reverse fluid pressure, said auxiliary structure including an externally exposed rotary manual control operable to rotate the motor in the absence of fluid pressure application thereto, and a flow control valve having a stopper movable between flow passing and flow blocking positions in response to rotation of said motor member with said coupling element in either of said first and second positions.

References Cited by the Examiner
UNITED STATES PATENTS

| | | | |
|---|---|---|---|
| 2,243,656 | 5/1941 | Shannon | 91—44 |
| 2,352,140 | 6/1944 | Trott | 91—391 |
| 2,415,603 | 2/1947 | Muller et al. | 60—97 |
| 2,444,391 | 6/1948 | Whitfield | 91—391 |
| 2,615,429 | 10/1952 | Jacques | 91—391 |
| 2,711,077 | 6/1955 | Adams | 60—97 |
| 3,093,120 | 6/1963 | Ayers | 91—391 |
| 3,094,041 | 6/1963 | Wagner | 91—391 |

FRED E. ENGELTHALER, *Primary Examiner.*